(12) United States Patent
Maqbool

(10) Patent No.: US 11,867,138 B2
(45) Date of Patent: Jan. 9, 2024

(54) SYSTEM AND METHOD FOR RAM AIR INTAKE FOR PULSE COMBUSTORS

(71) Applicant: North American Wave Engine Corporation, Baltimore, MD (US)

(72) Inventor: Daanish Maqbool, Hyattsville, MD (US)

(73) Assignee: NORTH AMERICAN WAVE ENGINE CORPORATION, Baltimore, MD (US)

( * ) Notice: Subject to any disclaimer, the term of this patent is extended or adjusted under 35 U.S.C. 154(b) by 0 days.

(21) Appl. No.: 18/050,714

(22) Filed: Oct. 28, 2022

(65) Prior Publication Data

US 2023/0133001 A1 May 4, 2023

Related U.S. Application Data

(60) Provisional application No. 63/273,035, filed on Oct. 28, 2021.

(51) Int. Cl.
| | |
|---|---|
| *F02C 5/00* | (2006.01) |
| *F23R 7/00* | (2006.01) |
| *F02K 7/20* | (2006.01) |
| *F02C 5/10* | (2006.01) |
| *F02C 5/02* | (2006.01) |
| *F02C 5/11* | (2006.01) |
| *F02C 7/04* | (2006.01) |

(52) U.S. Cl.
CPC ................. *F02K 7/20* (2013.01); *F02C 5/00* (2013.01); *F02C 5/02* (2013.01); *F02C 5/10* (2013.01); *F02C 5/11* (2013.01); *F02C 7/04* (2013.01); *F23R 7/00* (2013.01); *F05D 2240/35* (2013.01); *F05D 2250/324* (2013.01); *F05D 2250/511* (2013.01); *F05D 2260/85* (2013.01); *F05D 2260/99* (2013.01)

(58) Field of Classification Search
CPC ...... F02C 5/00; F02C 5/02; F02C 5/10; F02C 5/11; F02C 7/04; F02K 7/02; F02K 7/04; F02K 7/10; F02K 7/20; F23R 7/00
See application file for complete search history.

(56) References Cited

U.S. PATENT DOCUMENTS

| | | | |
|---|---|---|---|
| 2,574,460 A | * | 11/1951 | Bohanon ................... F02K 7/04 60/39.77 |
| 2,740,254 A | | 4/1956 | Ballauer |

(Continued)

FOREIGN PATENT DOCUMENTS

WO    WO-2023077064    5/2023

OTHER PUBLICATIONS

International Search Report and Written Opinion issued by the U.S. Patent and Trademark Office as International Searching Authority issued in PCT/US22/78866, dated Mar. 20, 2023 (11 pages).

*Primary Examiner* — Scott J Walthour
(74) *Attorney, Agent, or Firm* — Wilmer Cutler Pickering Hale and Dorr LLP

(57) ABSTRACT

A system and method for ram air intake for pulse combustion systems is disclosed that improves the ability of pulse combustions to ingest air into the inlet pipe when the pulse combustion system is moving in a direction opposite the direction the open end of the inlet pipe is facing and the system and method includes the ability to increase the thrust output from the pulse combustion system.

20 Claims, 3 Drawing Sheets

(56) References Cited

U.S. PATENT DOCUMENTS

| | | | |
|---|---|---|---|
| 2,750,733 A * | 6/1956 | Paris | F02K 7/075 |
| | | | 60/39.77 |
| 2,834,183 A | 5/1958 | Bertin | |
| 2,919,542 A * | 1/1960 | Servanty | F02K 7/04 |
| | | | 60/39.77 |
| 3,078,061 A | 2/1963 | Marie | |
| 3,517,510 A * | 6/1970 | Melenric | F02K 7/04 |
| | | | 60/39.77 |
| 3,823,554 A * | 7/1974 | Melenric | F02K 7/04 |
| | | | 60/39.77 |
| 6,216,446 B1 | 4/2001 | Stram | |
| 2005/0097897 A1 | 5/2005 | Ouelette | |
| 2020/0003158 A1 | 1/2020 | Maqbool | |

* cited by examiner

SYSTEM AND METHOD FOR RAM AIR INTAKE FOR PULSE COMBUSTORS

CROSS-REFERENCE TO RELATED APPLICATIONS

This application claims the benefit of priority to U.S. Provisional Application No. 63/273,035, filed on Oct. 28, 2021, the disclosure of which is hereby incorporated by reference in its entirety.

FIELD OF THE INVENTION

The present invention relates to air intakes and jet engines. More particularly, the present invention is related to systems and methods for ram air ingestion and increased thrust for pulse combustor systems.

BACKGROUND OF THE INVENTION

A conventional valveless-type combustor or pulsejet engine preferably includes a combustion chamber, an inlet pipe, fuel injector(s), spark plug (or other ignition device), and an exhaust pipe, which is sometimes referred to as "tailpipe". These conventional pulsejet engines may be configured straight or U-shaped. The combustion chamber, inlet pipe, and exhaust pipe are often cylindrical. Typically, the diameters of the inlet and exhaust pipes are less than the diameter of the combustion chamber. Further, the length of the inlet pipe is typically less than the length of the exhaust pipe.

When a fuel and air mixture is introduced into the combustion chamber, the spark plug or other ignition device is activated to produce a spark that ignites the fuel/air mixture. The ensuing combustion process causes a rise in the temperature and pressure of the gases inside the combustion chamber. These gases then expand and escape through the inlet and exhaust pipes. The high velocity and inertia of the escaping gases cause an overexpansion and negative pressure inside the combustion chamber. This negative pressure then reverses the direction of the flow in the inlet and exhaust pipes. Fresh air sucked in from the atmosphere via the inlet pipe because of its shorter length mixes with the fuel that is injected either in the inlet pipe or directly into the combustion chamber. The new fuel/air mixture enters the combustion chamber where it encounters the high-temperature combustion products from the previous combustion event. These combustion products ignite this new fuel/air mixture to produce another combustion event and the process repeats indefinitely as long as there is fuel being injected into the combustion chamber as described.

In tracking the combustion events, there is also flow reversal in the exhaust pipe due to the negative pressure in the combustion chamber. However, due to the length of the exhaust pipe, the fresh air drawn in from the atmosphere does not typically reach the combustion chamber before the next combustion event. Also, the spark plug is only needed to start operation of the engine, and is not necessary to sustain the operation of the engine. Therefore, the spark plug can be turned off once the engine is started.

The result of the working cycle of a pulse combustor is that the inlet and exhaust ends produce oscillating flows, i.e., intermittent jets of gas that emanate from them and are responsible for thrust generation. The exhaust pipe usually generates the greatest amount of thrust, but the inlet pipe can also generate a significant amount of thrust, which typically would be in the order of two-thirds (⅔) the thrust generated at the exhaust pipe. Therefore, in order to capture the thrust generated by both the inlet and exhaust pipes, the distal ends of the two pipes are made to point in the same direction. Typically, this is accomplished by the exhaust pipe being bent so that the inlet pipe points in the same direction as the exhaust pipe, and giving the engines a "U-shape".

Pulse combustors can have a number of different forms. Some have multiple inlets, while others have inlets that are perpendicular to the exhaust pipe. Nevertheless, all these embodiments have the same working principle as described above.

Advantages of pulse combustors include the ability to draw in fresh air and sustain operation without any external machinery or moving parts. Pulse combustors have been used as thrust-producing devices, in which case they are commonly referred to as "pulsejet", "pulse jet" or "wave" engines. Pulsejet engines have a long history and have been used to propel several types of aircraft over the last century. They are often characterized by a diverging exhaust pipe to aid in thrust production.

Noting the construction of pulsejet engines described above, they are characterized by their simplicity because of the lack of moving parts. However, when used in a forward airspeed environment, e.g., in a flying vehicle, these propulsion devices can find it difficult to effectively use ram air pressure because the inlet is often pointed away from the incoming airstream. Also, if the inlet is a rearward facing, it can be difficult for it to ingest air because the oncoming freestream air has to be turned in an opposite direction, i.e., turned 180°, to travel into the inlet.

Noting the foregoing, it would be advantageous to decelerate the air around the open end(s) of the pulsejet engine. It would also be advantageous to recover the dynamic pressure of the oncoming freestream air and raise the static pressure around the inlet to provide higher pressure and higher density air for the inlet to ingest; thereby, allowing for more engine power and thrust.

Previous pulsejet engine designs have attempted to address these problems by the placement of the engine, or parts thereof, inside a diffuser shroud. Examples of such arrangements include the systems described in. U.S. Pat. No. 2,750,733 to Paris et al. and U.S. Pat. No. 2,919,542 to Servanty et al.

While these arrangements have attempted to decelerate the airstream for pressure recovery and subsequent intake by the engine, they also have drawbacks that limit their practical usability. The first is they require a large size shroud to enclose the engine or parts thereof. Second, the air passing through the shroud intake and entering the shroud comes into contact with hot engine components. These components will heat and rarify the air prior to ingestion by the engine. This runs counter to the objective of maximizing air density for engine air ingestion and maximizing engine thrust output. For these reasons, it is desirable to have a pulsejet engine system engine in which the air intake apparatus allow for ram air intake, deceleration and pressure recovery, but is also compact and minimizes heating of the airstream prior to ingestion by the engine.

SUMMARY OF THE INVENTION

The present invention is directed to novel pulsejet engine system and method that includes ram air intake and engine starting methods in light of the ram air intake. The pulsejet engine of the present invention besides including the inlet pipe, combustion chamber, exhaust pipe, spark plug or other ignition device, and fuel injector(s) includes a diffuser air intake, intake plenum, intake-side augmenter duct, and adjustable baffle. In operation, when the engine/vehicle is operational and in motion, the diffuser air intake ingests, decelerates, and turns the air, before releasing it into a plenum that surrounds the engine inlet pipe. This allows the engine inlet to ingest air at a lower velocity and higher mass density, compared to the freestream air ingressing diffuser air intake. The lower velocity air is easier for the engine to ingest via its backward-facing inlet, and the higher air density allows the engine to ingest a larger mass of air than would be otherwise possible if the air was heated. Last, there is a rearward-facing augmenter (or ejector) duct attached to the intake plenum that facilitates pumping a large volume of air using the exhaust jet emanating from the engine inlet pipe after combustion events for increased thrust production. These elements function to allow for an increase in the amount of thrust and power that the engine develops with forward airspeed.

A further feature of the present invention is that the augmenter duct has an adjustable baffle. When the engine/vehicle is in motion, this baffle can be fully or partially closed to force air through the engine (engine inlet pipe) for engine starting.

The present invention will be described in greater detail in the remainder of this specification referring to the drawings.

BRIEF DESCRIPTION OF THE DRAWING(S)

Figure 1:
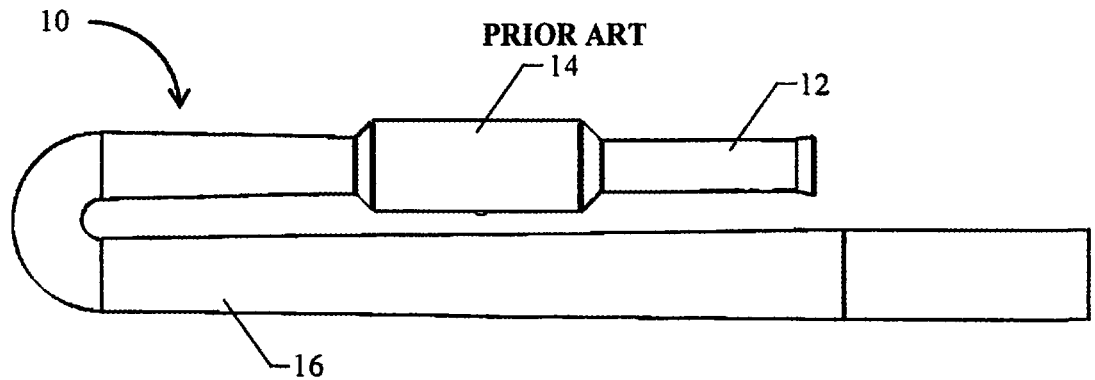
FIG. 1 shows a representative side view of a prior art U-shape pulse combustor.

| REFERENCE NUMERALS IN THE DRAWING(S) | |
|---|---|
| Ref. No. | Description |
| 10 | Pulse Combustor |
| 12 | Inlet Pipe |
| 14 | Combustion Chamber |
| 16 | Exhaust Pipe |
| 20 | Ram Air Intake |
| 22 | Diffuser Duct |
| 24 | Inlet Plenum |
| 26 | Inlet-Side Augmenter |

| REFERENCE NUMERALS IN THE DRAWING(S) -continued | |
|---|---|
| Ref. No. | Description |
| 32 | Starting Baffle |
| 34 | Starting Drogue |
| 42 | Airframe |
| 44 | Cooling Air Intake |

DETAILED DESCRIPTION OF THE INVENTION

With respect to this Specification, it is understood that the terms "pulse combustor," "pulse jet engine," "pulse jet," "pulsejet engine," "pulsejet," or "wave engine" are used synonymously. It is understood that a pulsejet or pulse jet engine is a pulse combustor that is used for thrust production. It is also understood that wave engines are a class or family of engines, within which a type of engine is a pulsejet engine.

Pulse combustors, particularly when used as thrust-producing devices, i.e., as pulsejets, can encounter operational challenges with forward airspeed. One challenge is to make use of the dynamic pressure, or ram pressure, of the oncoming airstream, which can be difficult because of the rearward orientation of the inlet pipe. Another possible challenge is the ingestion of air because it has to be turned 180° in order to enter the inlet pipe. This can be seen with respect to the prior art pulse combustor that is shown in FIG. 1.

Generally, at 10, FIG. 1 shows a representative side view of a prior art pulse combustor. Preferably, pulse combustor 10 includes inlet pipe 12 connected to one open end of combustion chamber 14. The other open end of combustion chamber 14 is connected to exhaust pipe 16. Although not shown, it is understood that pulse combustor includes one or more fuel injectors that inject fuel into the inlet pipe 12 or directly into combustion chamber 14 for mixing with the air ingested through inlet pipe 12 to form the fuel/air mixture for combustion in combustion chamber 14. Further, pulse combustor 10 includes a spark plug or other ignition device (e.g., glow plug) (not shown) for igniting the fuel/air mixture in combustion chamber 14. These latter two components are known in the art.

Figure 2:
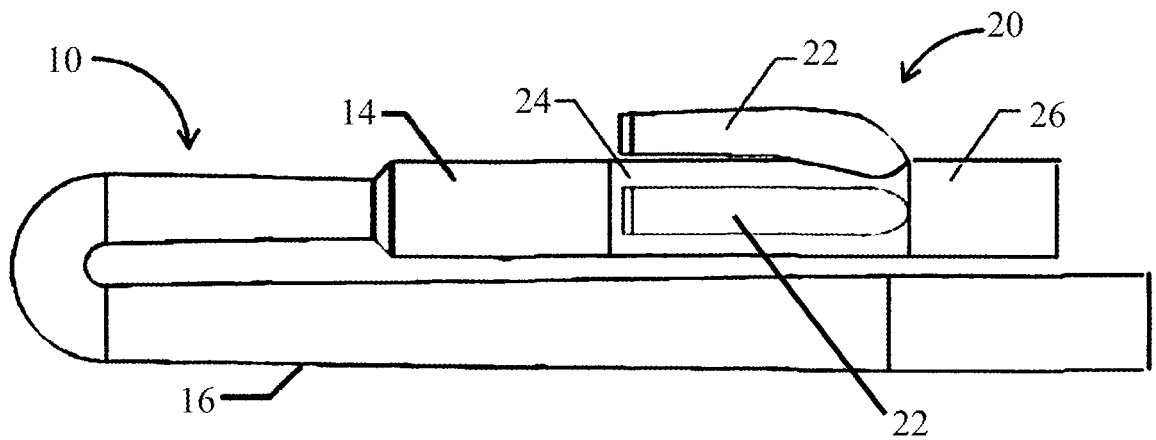
FIG. 2 shows a representative side view of an embodiment of the present invention that shows a U-shape pulse combustor with the ram air intake assembly attached thereto.

FIG. 2 shows a representative side view of an embodiment of the present invention that shows U-shape pulse combustor 10 with ram air intake assembly 20 attached thereto. Ram air intake assembly 20 at least includes diffuser duct 22 (two shown), intake plenum 24, and inlet-side augmenter 26. When ram air intake assembly 20 is attached to the pulse combustor 10, inlet pipe 12 will be disposed in intake plenum 24. Each diffuser duct 22 has a front end that is open to the atmosphere and a second end opens to intake plenum 24 substantially near the open end of inlet pipe 12. Inlet-side augmenter 26 has its proximal end in fluid communication with the distal end of intake plenum 24, and distal end open to the atmosphere. It is understood to be within the scope of the present invention that there can be one or more diffuser ducts spaced around the intake plenum.

Figure 3:
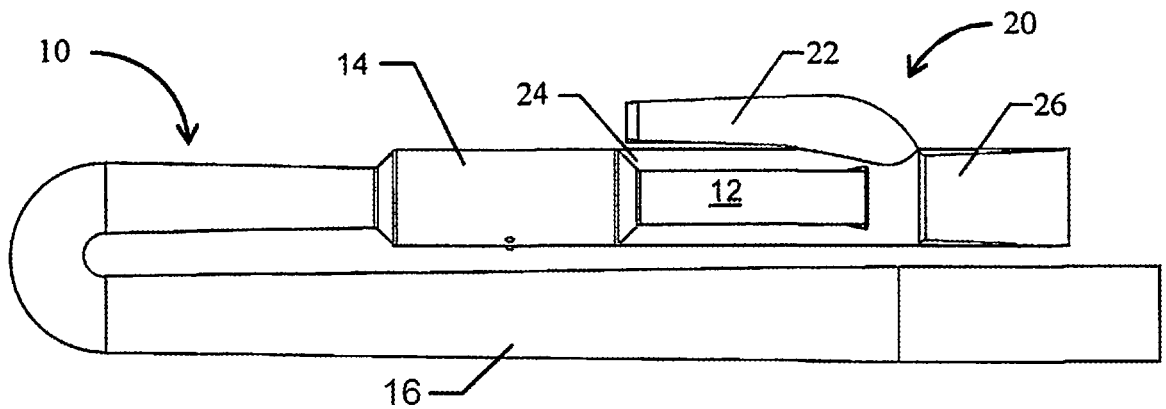
FIG. 3 shows the representative side view of the embodiment of the present invention shown in FIG. 2 with a portion of the ram air intake assembly cutaway to show its interior and relationship with the U-shaped pulse combustor.
Figure 4:
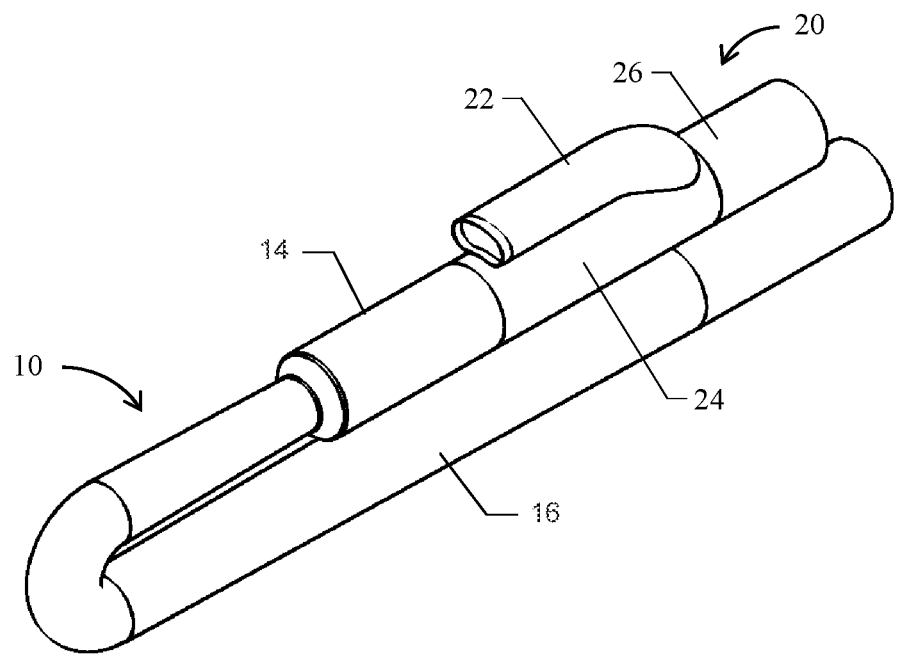
FIG. 4 shows a representative top left perspective view of the embodiment of the present invention shown in FIG. 2.

Referring now to FIGS. 2-4, the U-shape pulse combustor of the present invention with the ram air intake assembly is shown that addresses the aforementioned challenges. According to these Figures, diffuser duct 22 is divergent from its front end open to ram air rearward to where it connects to inlet plenum 24. This is so it will function as an aerodynamic diffuser. As such, diffuser duct 22 accepts ram air from the oncoming airstream/freestream and expands its cross-sectional flow area, thereby reducing its velocity and increasing its pressure, that is the air's "static pressure" as one skilled in the art would understand. Thereafter, diffuser duct 22 has the ability to turn the air flow towards inlet pipe 12 as the diffuser duct 22 releases the air into inlet plenum 24.

Preferably, diffuser duct 22 carries out at least two functions: it reduces the air speed and raises the air pressure. The higher air pressure ('static pressure') assists the ingestion of air by pulse combustor 10 via the inlet pipe 12. This is accomplished by the diffuser duct providing a higher driving pressure difference across inlet pipe 12 during an intake event, and also by raising the air density of the ingested volume of air. The lower velocity of the air processed by the diffuser duct also assists air ingestion in inlet pipe 12 by necessitating a smaller amount of air acceleration for its ingestion.

In the operation of the system shown in FIGS. 2-4, after air ingestion by pulse combustor 10 via inlet pipe 12, the air is mixed with injected fuel and combusted to produce high pressure within combustion chamber 14 and the subsequent ejection of hot gases from inlet pipe 12 and exhaust pipe 16. The ejected hot gases produce thrust for propelling, for example, an air vehicle.

According to the present invention, the ejected hot gas jet from the inlet pipe 12 mixes with air present in inlet plenum 24 and the gases are then expelled (accelerated) out of the system of the present invention via inlet-side augmenter 26. As shown more clearly in FIG. 3, the walls of inlet-side augmenter 26 are divergent and airfoil-shaped to ease expansion and acceleration of gases as they are ejected. In this manner, inlet-side augmenter 26 functions as an "ejector nozzle." As such, it increases the amount of air moved by the propulsion system of the present invention, which includes pulse combustor 10 and ram air intake 20, and, therefore increases thrust.

For starting of pulse combustors, it is often necessary to blow or force air into the pulse combustor through the inlet pipe while injecting fuel and then providing an ignition source, e.g., a spark plug spark, to ignite the fuel/air mixture to produce the initial combustion event(s) that subsequently lead to self-sustaining engine operation. This starting air can be drawn from a mechanical blower or compressed air source, but either usually necessitates an additional heavy and/or complex apparatus, which is undesirable for an air vehicle.

Figure 5:
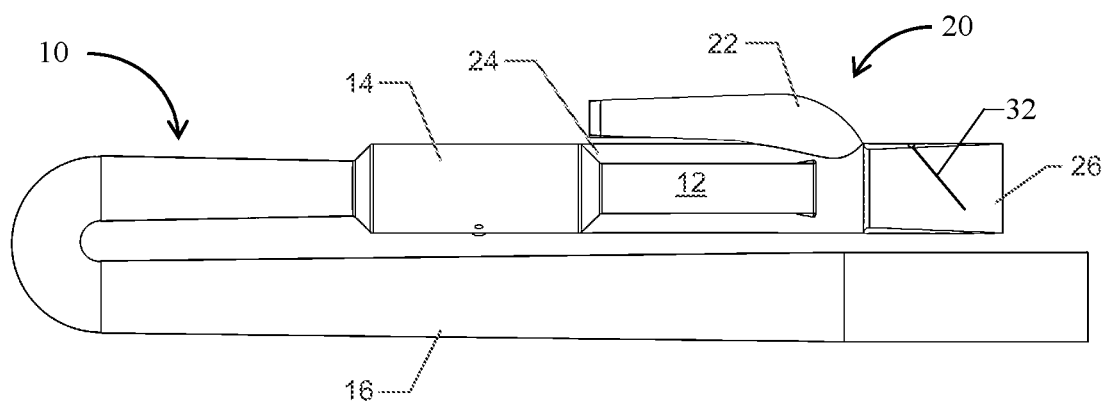
FIG. 5 shows a representative side view of the embodiment of the present invention shown in FIG. 2 with a portion of the ram air intake assembly cutaway to show its interior having a starting baffle and relationship with the U-shaped pulse combustor.

An embodiment of the present invention that is shown in FIG. 5 addresses this issue by allowing starting air to be drawn from ram air for an engine (vehicle) in motion, such as, an air vehicle in a dive. Referring to FIG. 5, an adjustable starting baffle 32 is disposed within inlet-side augmenter 26. The baffle can be positioned within inlet-side augmenter 26 to substantially allow full flow through the augmenter or restrict to a desired degree. When the baffle is deployed to restrict air flow through inlet-side augmenter 26 to a desired degree with the air vehicle having forward air speed, ram air is forced into diffuser duct 22 and inlet plenum 24. Under these conditions, a relatively large volume of ram air will be forced to vent to the atmosphere through inlet pipe 12, combustion chamber 14, and exhaust pipe 16. As the ram air is forced into inlet pipe 12, fuel can be injected and an ignition source can be activated, to start pulse combustor 10. Once pulse combustor 10 has achieved resonant, self-sustaining operation, starting baffle 32 can be retracted or folded to permit unimpeded airflow through inlet-side augmenter 26 and nominal propulsion system operation.

Figure 6:
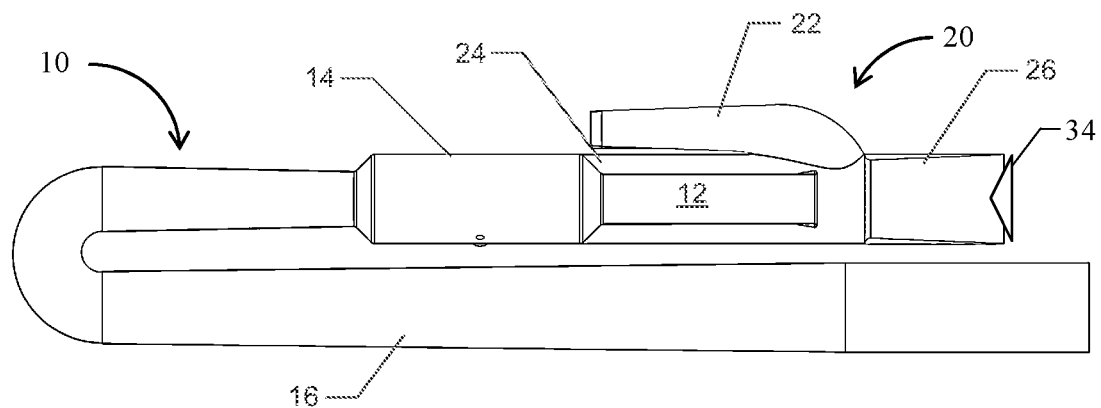
FIG. 6 shows a representative side view of the embodiment of the present invention shown in FIG. 2 with a portion of the ram air intake assembly cutaway to show its interior having a starting drogue and relationship with the U-shaped pulse combustor.

Another embodiment of the present invention that is capable of achieving ram air starting is shown in FIG. 6. Referring to FIG. 6, the distal end of inlet-side augmenter 26 has starting drogue 34 disposed there. The drogue is an axisymmetric baffle that is capable of limiting airflow through inlet-side augmenter 26 and forcing ram air through inlet pipe 12 for starting pulse combustor 10. Once pulse combustor 10 has started, starting drogue 34 can be folded or jettisoned to allow for unimpeded airflow through inlet-side augmenter 26 and nominal propulsion system operation.

Figure 7:
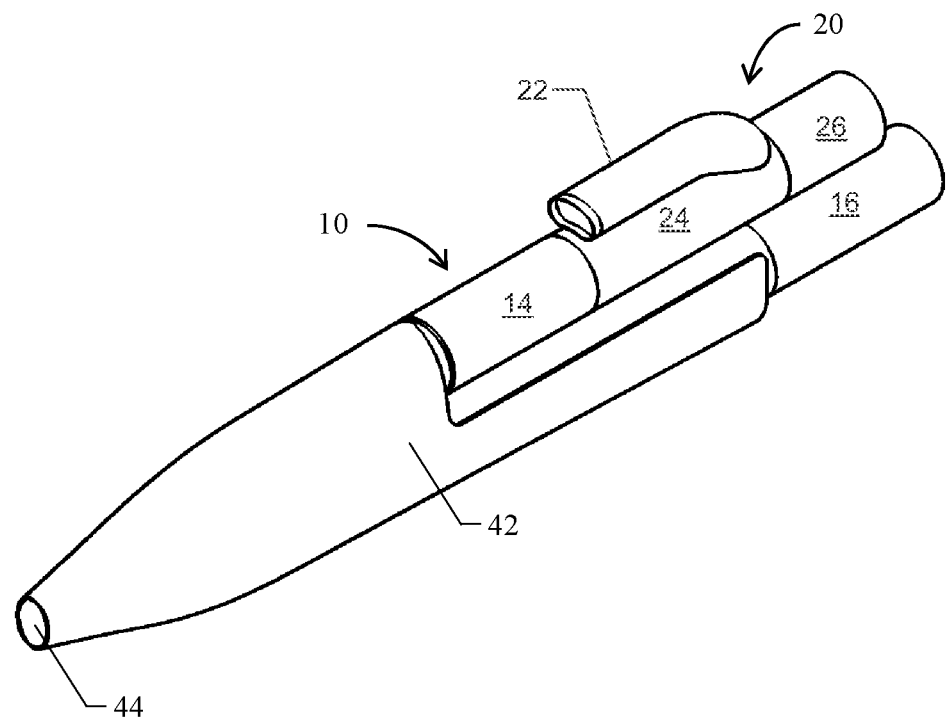
FIG. 7 shows a representative top left perspective of an embodiment of the present invention that shows a U-shaped pulse combustor with the air intake assembly integrated within a representative airframe.

Pulse combustor 10 of the present invention that includes ram air intake 20 can be integrated into a flight vehicle or air vehicle in variety of ways. For example, as shown in FIG. 7, diffuser duct 22 can open on top of airframe 42. In this example, airframe 42 also hosts a cooling air intake 44, in which a small amount of freestream air enters into airframe 42 around pulse combustor 10 for cooling purposes. This arrangement may also be vertically flipped, i.e., the engine may be placed "upside down" with inlet pipe 12 at the bottom (ground-facing side) and exhaust pipe 16 at the top (sky-facing side) of the airframe. In this manner, diffuser duct 22 can be situated at the bottom side of an air vehicle. Diffuser duct 22 can also be in the form of "gills" or side-oriented scoops to channel the oncoming air into inlet plenum 24. These alternative configurations are part of the present invention.

The described embodiments of the present invention in this Specification are meant to be representative of the use of a diffuser duct, augmenter and baffle with a U-shaped pulsejet engine. However, someone of ordinary skill in the art would understand other embodiments are possible that will be within the scope of the present invention. Accordingly, what is described in this Specification is meant for purposes of description, not limitation.

The invention claimed is:

1. A method for starting a pulse combustor system moving in a second direction, comprising the steps of:

A. providing a pulse combustor including at least a combustion chamber, an inlet pipe, an exhaust pipe, and a fuel injector for injecting fuel into the combustion chamber, and an ignition means for ignition of a combustible fuel and air mixture in the combustion chamber at least for starting the pulse combustor, with a first open end of the inlet pipe and a first open end of the exhaust pipe pointing in a first direction, and a ram air intake assembly connected to the pulse combustor, with the ram air intake assembly including at least a plenum having a first end connected to an inlet pipe end of the combustion chamber and extending therefrom in the first direction past the first open end of the inlet pipe to form a second open end of the plenum, a diffuser duct in fluid communication with the plenum having a first open end open to atmospheric air pointing in the second direction which is opposite to the first direction and having a first cross-sectional area, the diffuser duct further comprising a second open end having a cross-sectional area greater than the first open end of the diffuser duct, and connected to, and in fluid communication with, the plenum, and a diffuser duct body that has a divergent shape from the first open end of the diffuser duct to the second open end of the diffuser duct, and an augmenter having a first open end connected to, and in fluid communication with, the second open end of the plenum and the augmenter having a second open end facing in the first direction and open to atmospheric air, and an augmenter body that diverges from the first open end of the augmenter to the second open end of the augmenter, with the augmenter having a movable baffle associated therewith for controlling an amount of decreased velocity and increased static pressure air passing therethrough;

B. moving the pulse combustor in the second direction and ingressing atmospheric air into the diffuser duct through the first open end of the diffuser duct and exiting atmospheric air from the second open end of the diffuser duct into the plenum, with the exiting air having a decreased velocity and an increased static pressure compared to a velocity and static pressure of the atmospheric air ingressing the diffuser duct through the first open end of the diffuser duct;

C. deploying the baffle to restrict an amount of air passing through the augmenter and forcing an increased a flow of the exiting air into the second open end of the inlet pipe for mixing with fluid and igniting the air and fuel mixture with the ignition means for causing a combustion event in the combustion to start the pulse combustor; and D. cease deploying the baffle after the pulse combustor is started.

2. The method of claim 1, wherein the baffle comprises a movable flap.

3. The method of claim 1, wherein the baffle comprises a collapsible or disposable drogue.

4. A method for supplying input air and increasing thrust in a pulse combustor system comprising the steps of:

providing a pulse combustor including at least a combustion chamber, an inlet pipe, an exhaust pipe, and a fuel injector for injecting fuel into the combustion chamber, and an ignition means for ignition of a combustible fuel and air mixture in the combustion chamber at least for starting the pulse combustor, with a first open end of the inlet pipe and a first open end of the exhaust pipe pointing in a first direction, and a ram air intake assembly connected to the pulse combustor, with the ram air intake assembly including at least a plenum having a first end connected to an inlet pipe end of the combustion chamber and extending therefrom in the first direction past the first open end of the inlet pipe to form a second open end of the plenum, a diffuser duct in fluid communication with the plenum having a first open end open to atmospheric air pointing in a second direction that is opposite to the first direction and having a first cross-sectional area, the diffuser duct further comprising a second open end having a cross-sectional area greater than the first open end of the diffuser duct, and connected to, and in fluid communication with, the plenum, and a diffuser duct body that has a divergent shape from the first open end of the diffuser duct to the second open end of the diffuser duct, and an augmenter having a first open end connected to, and in fluid communication with, the second open end of the plenum and the augmenter having a second open end facing in the first direction and open to atmospheric air, and an augmenter body that diverges from the first open end of the augmenter to the second open end of the augmenter;

A. moving the pulse combustor in the second direction and ingressing atmospheric air into the diffuser duct through the first open end of the diffuser duct and exiting atmospheric air from the second open end of the diffuser duct into the plenum, with the exiting air having a decreased velocity and an increased static pressure compared to a velocity and static pressure of the atmospheric air ingressing the diffuser duct through the first open end of the diffuser duct and inputting the decreased velocity and increased static pressure atmospheric air into the second open end of the inlet pipe for mixing with fluid for causing a combustion event when ignited by the ignition means or residual combustion products for a previous combustion event; and B. expelling combustion gas streams from the first open end of the inlet pipe in the first direction into and through the first open end of the plenum into the augmenter, with the augmenter increasing thrust generated by the expelling combustion gas streams as the combustion gas streams pass through the augmenter in the first direction and exit the second open end of the augmenter.

5. A pulse combustor system with improved air intake and thrust generation, comprising:

a pulse combustor including at least a combustion chamber, an inlet pipe, an exhaust pipe, and a fuel injector for injecting fuel into the combustion chamber, and an ignition means for ignition of a combustible fuel and air mixture in the combustion chamber at least for starting the pulse combustor, with a first open end of the inlet pipe and a first open end of the exhaust pipe pointing in a first direction; and a ram air intake assembly connected to the pulse combustor, with the ram air intake assembly including at least a plenum having a first end connected to an inlet pipe end of the combustion chamber and extending therefrom in the first direction past the first open end of the inlet pipe to form a second open end of the plenum, a diffuser duct in fluid communication with the plenum having a first open end open to atmospheric air and pointing in a second direction that is opposite to the first direction and having a first cross-sectional area, a second open end having a cross-sectional area greater than the first open end of the diffuser duct, and connected to, and in fluid communication with, the plenum, and a diffuser duct body that has a divergent shape from the first open end of the diffuser duct to the second open end of the diffuser duct, an augmenter having a first open end connected to, and in fluid communication with, the second open end of the plenum and the augmenter having a second open end facing in the first direction and open to atmospheric air, and an augmenter body that diverges from the first open end of the augmenter to the second open end of the augmenter.

6. The pulse combustor system of claim 5, wherein when the pulse combustor system is ingesting air the diffuser duct decreases the velocity of air passing therethrough from the first open end to the second open end.

7. The pulse combustor system of claim 6, wherein when the pulse combustor system is ingesting air the diffuser duct increases the static pressure of air passing therethrough from the first open end of the diffuser duct to the second open end of the diffuser duct.

8. The pulse combustor system of claim 7, wherein when the pulse combustor system is in motion in the second direction the diffuser duct delivers reduced velocity, higher static pressure air to the plenum compared to the atmospheric air entering the first open end of the diffuser duct.

9. The pulse combustor system of claim 5, wherein the augmenter is configured to increase thrust of combustion gas streams output from the first open end of the inlet pipe.

10. The pulse combustor system of claim 5, wherein the augmenter includes a baffle for reducing fluid flow therethrough for starting the pulse combustor system when the pulse combustor system is ingesting air.

11. The pulse combustor system of claim 10, wherein the baffle comprises a movable flap.

12. The pulse combustor system of claim 10, wherein the baffle comprises a collapsible or disposable drogue.

13. A pulse combustor system with improved air intake and thrust generation, comprising:
   a pulse combustor including at least a combustion chamber, an inlet pipe, an exhaust pipe, and a fuel injector for injecting fuel into the combustion chamber, and an ignition means for ignition of a combustible fuel and air mixture in the combustion chamber at least for starting the pulse combustor, with a first open end of the inlet pipe and a first open end of the exhaust pipe pointing in a first direction; and
   a ram air intake assembly connected to the pulse combustor, with the ram air intake assembly including at least
   a plenum having a first end connected to an inlet pipe end of the combustion chamber and extending therefrom in the first direction past the first open end of the inlet pipe to form a second open end,
   a plurality of diffuser ducts connected to the plenum and each in fluid communication with the plenum and each having a first open end open to atmospheric air pointing in a second direction that is opposite to the first direction and having a first cross-sectional area, and each having a second open end having a cross-sectional area greater than the first open end of the respective diffuser duct, and connected to, and in fluid communication with, the plenum, and each having a diffuser duct body that has a divergent shape from the first open end of each respective diffuser duct to the second open end of each respective diffuser duct, and
   an augmenter having a first open end connected to, and in fluid communication with, the second open end of the plenum and a second open end facing in the first direction and open to atmospheric air, and an augmenter body that diverges from the first open end of the augmenter to the second open end of the augmenter.

14. The pulse combustor system of claim 13, wherein when the pulse combustor system is ingesting air each of the plurality of diffuser ducts decreases the velocity of air passing therethrough from the first open end of each respective diffuser duct to the second open end of each respective diffuser duct.

15. The pulse combustor system of claim 14, wherein when the pulse combustor system is ingesting air each of the plurality of diffuser ducts increases the static pressure of air passing therethrough from the first open end of each respective diffuser duct to the second open end of each respective diffuser duct.

16. The pulse combustor system of claim 15, wherein when the pulse combustor system is ingesting air each of the plurality of diffuser ducts delivers reduced velocity, higher static pressure air to the plenum compared to the atmospheric air entering the first open end of each respective the diffuser duct.

17. The pulse combustor system of claim 13, wherein the augmenter is configured to increase thrust of combustion gas streams output from the first open end of the inlet pipe.

18. The pulse combustor system of claim 13, wherein the augmenter includes a baffle for reducing fluid flow therethrough for starting the pulse combustor system when the pulse combustor system is in motion in the second direction.

19. The pulse combustor system of claim 18, wherein the baffle comprises a movable flap.

20. The pulse combustor system of claim 18, wherein the baffle comprises a collapsible or disposable drogue.

* * * * *